(12) United States Patent
Schuh et al.

(10) Patent No.: US 11,390,783 B2
(45) Date of Patent: Jul. 19, 2022

(54) ADHESIVES COMPRISING ACTIVATABLE GETTER MATERIALS

(71) Applicant: TESA SE, Norderstedt (DE)

(72) Inventors: Christian Schuh, Hamburg (DE); Klaus Keite-Telgenbüscher, Hamburg (DE); Chris Gäbert, Weißenburg (DE)

(73) Assignee: TESA SE, Norderstedt (DE)

( * ) Notice: Subject to any disclaimer, the term of this patent is extended or adjusted under 35 U.S.C. 154(b) by 282 days.

(21) Appl. No.: 16/429,831

(22) Filed: Jun. 3, 2019

(65) Prior Publication Data

US 2019/0284450 A1 Sep. 19, 2019

Related U.S. Application Data

(63) Continuation of application No. 15/520,003, filed as application No. PCT/EP2015/073898 on Oct. 15, 2015, now abandoned.

(30) Foreign Application Priority Data

Oct. 29, 2014 (DE) .......................... 102014222038.6

(51) Int. Cl.
*C09J 163/00* (2006.01)
*C09J 153/02* (2006.01)
(Continued)

(52) U.S. Cl.
CPC ............ *C09J 163/00* (2013.01); *C08G 59/24* (2013.01); *C08K 5/5435* (2013.01); *C08L 53/02* (2013.01); *C08L 91/00* (2013.01); *C09D 163/00* (2013.01); *C09J 5/00* (2013.01); *C09J 7/10* (2018.01); *C09J 9/00* (2013.01); *C09J 11/06* (2013.01); *C09J 153/02* (2013.01); *H01L 51/5246* (2013.01); *H01L 51/5259* (2013.01); *C08K 5/5415* (2013.01); *C08K 2201/008* (2013.01); *C09J 2203/318* (2013.01);
(Continued)

(58) Field of Classification Search
None
See application file for complete search history.

(56) References Cited

U.S. PATENT DOCUMENTS 3,729,319 A 4/1973 Jefferson et al.
3,741,769 A 6/1973 Smith
(Continued)

FOREIGN PATENT DOCUMENTS

DE 10 2008 047 964 A1 3/2010
DE 10 2012 211 335 A1 1/2014
(Continued)

OTHER PUBLICATIONS

Translation of Office Action dated Sep. 4, 2019, in connection with Chinese Patent Application No. 201580058849.7.
(Continued)

*Primary Examiner* — Bo B Jang
(74) *Attorney, Agent, or Firm* — Norris McLaughlin PA (57) ABSTRACT

An adhesive comprising a getter material and optionally a solvent comprising a catalyst activatable by means of an external stimulus for the reaction of the getter material with a permeate can tolerate brief contact with permeates such as moisture in particular before user application, without any significant impairment of getter capacity.

32 Claims, 3 Drawing Sheets

(51) Int. Cl.
*H01L 51/52* (2006.01)
*C08L 53/02* (2006.01)
*C09J 9/00* (2006.01)
*C09D 163/00* (2006.01)
*C08G 59/24* (2006.01)
*C09J 7/10* (2018.01)
*C08L 91/00* (2006.01)
*C08K 5/5435* (2006.01)
*C09J 11/06* (2006.01)
*C09J 5/00* (2006.01)
*C08K 5/5415* (2006.01)

(52) U.S. Cl.
CPC .... *C09J 2203/322* (2013.01); *C09J 2203/326* (2013.01); *C09J 2203/33* (2013.01); *C09J 2301/408* (2020.08); *C09J 2453/00* (2013.01); *C09J 2463/00* (2013.01)

(56) References Cited

U.S. PATENT DOCUMENTS

| | | | |
|---|---|---|---|
| 4,002,584 | A | 1/1977 | Takahashi et al. |
| 4,058,401 | A | 11/1977 | Crivello |
| 4,138,255 | A | 2/1979 | Crivello |
| 4,231,951 | A | 11/1980 | Smith et al. |
| 4,250,053 | A | 2/1981 | Smith |
| 4,256,828 | A | 3/1981 | Smith |
| 4,394,402 | A | 7/1983 | Yasuta et al. |
| 4,394,403 | A | 7/1983 | Smith |
| 5,304,419 | A | 4/1994 | Shores |
| 5,879,855 | A | 3/1999 | Schädeli et al. |
| 5,888,925 | A | 3/1999 | Smith et al. |
| 6,040,108 | A | 3/2000 | Schädeli et al. |
| 6,087,070 | A | 7/2000 | Turner et al. |
| 6,121,354 | A | 9/2000 | Chronister |
| 6,180,315 | B1 | 1/2001 | Schädeli et al. |
| 6,489,374 | B1 | 12/2002 | Baudin et al. |
| 6,867,244 | B2 | 3/2005 | Klinkenberg et al. |
| 6,908,722 | B2 | 6/2005 | Ebata et al. |
| 6,936,131 | B2 | 8/2005 | McCormick et al. |
| 7,538,104 | B2 | 5/2009 | Baudin et al. |
| 8,343,304 | B2 | 1/2013 | Burckhardt |
| 8,404,077 | B2 | 3/2013 | Burckhardt |
| 8,460,969 | B2 | 6/2013 | Krawinkel et al. |
| 8,551,620 | B2 | 10/2013 | Reyes, Jr. et al. |
| 8,557,084 | B2 | 10/2013 | Keite-Telgenbüscher et al. |
| 8,771,459 | B2 | 7/2014 | Keite-Telgenbüscher et al. |
| 8,809,458 | B2 | 8/2014 | Manabe et al. |
| 8,828,500 | B2 | 9/2014 | Arai et al. |
| 8,968,662 | B2 | 3/2015 | Haarer et al. |
| 9,011,794 | B2 | 4/2015 | Haarer et al. |
| 9,379,356 | B2 | 6/2016 | Verschuren et al. |
| 9,422,460 | B2 | 8/2016 | Yoo et al. |
| 9,487,684 | B2 | 11/2016 | Krawinkel et al. |
| 9,543,549 | B2 | 1/2017 | Bai et al. |
| 9,567,499 | B2 | 2/2017 | Thiele et al. |
| 9,593,263 | B2 | 3/2017 | Keite-Telgenbüscher et al. |
| 9,627,646 | B2 | 4/2017 | Ellinger et al. |
| 9,631,127 | B2 | 4/2017 | Keite-Telgenbüscher et al. |
| 9,714,366 | B2 | 7/2017 | Lühmann et al. |
| 2003/0113658 | A1 | 6/2003 | Ebata et al. |
| 2003/0143423 | A1 | 7/2003 | McCormick et al. |
| 2003/0212164 | A1 | 11/2003 | Klinkenberg et al. |
| 2004/0242867 | A1 | 12/2004 | Baudin et al. |
| 2005/0165169 | A1 | 7/2005 | Levey et al. |
| 2006/0093844 | A1 | 5/2006 | Conklin et al. |
| 2006/0100299 | A1 | 5/2006 | Malik et al. |
| 2006/0278338 | A1 | 12/2006 | Reyes, Jr. et al. |
| 2007/0193675 | A1 | 8/2007 | Gurav et al. |
| 2007/0268581 | A1 | 11/2007 | Palmateer | |
| 2009/0159117 | A1 | 6/2009 | Ferri et al. |
| 2010/0063221 | A1 | 3/2010 | Manabe et al. |
| 2010/0068514 | A1 | 3/2010 | Ellinger et al. |
| 2010/0137530 | A1* | 6/2010 | Arai ............. C09J 163/00 525/524 |
| 2010/0148127 | A1 | 6/2010 | Ellinger et al. |
| 2010/0159238 | A1 | 6/2010 | Reyes, Jr. et al. |
| 2010/0203302 | A1 | 8/2010 | Stricker et al. |
| 2010/0234484 | A1 | 9/2010 | Schellenberg et al. |
| 2010/0296545 | A1 | 11/2010 | Haarer et al. |
| 2011/0036496 | A1 | 2/2011 | Keite-Telgenbüscher et al. |
| 2011/0036623 | A1 | 2/2011 | Keite-Telgenbüscher et al. |
| 2011/0048509 | A1 | 3/2011 | Becker et al. |
| 2011/0048513 | A1 | 3/2011 | Booth et al. |
| 2011/0121356 | A1 | 5/2011 | Krawinkel et al. |
| 2011/0155043 | A1 | 6/2011 | Haarer et al. |
| 2011/0198030 | A1 | 8/2011 | Burckhardt |
| 2011/0198031 | A1 | 8/2011 | Burckhardt |
| 2011/0247674 | A1 | 10/2011 | Fujii et al. |
| 2011/0277915 | A1 | 11/2011 | Langezaal et al. |
| 2012/0064318 | A1 | 3/2012 | Keite Telgenbüscher et al. |
| 2012/0125438 | A1 | 5/2012 | Shimizu |
| 2013/0020935 | A1 | 1/2013 | Ohazama |
| 2013/0183471 | A1 | 7/2013 | Lühmann et al. |
| 2013/0203935 | A1 | 8/2013 | Thiele et al. |
| 2013/0264724 | A1 | 10/2013 | Telgenbüscher et al. |
| 2014/0322526 | A1 | 10/2014 | Dollase et al. |
| 2014/0346555 | A1 | 11/2014 | Verschuren et al. |
| 2014/0363603 | A1 | 12/2014 | Keite Telgenbüscher et al. |
| 2015/0099081 | A1 | 4/2015 | Bai et al. |
| 2015/0162568 | A1 | 6/2015 | Bai et al. |
| 2015/0284595 | A1 | 10/2015 | Yoo et al. |
| 2015/0337174 | A1 | 11/2015 | Keite-Telgenbüscher et al. |
| 2015/0337175 | A1 | 11/2015 | Keite-Telgenbüscher et al. |
| 2017/0028677 | A1 | 2/2017 | Lee et al. |
| 2017/0247582 | A1 | 8/2017 | Keite-Telgenbüscher et al. |

FOREIGN PATENT DOCUMENTS

| | | | |
|---|---|---|---|
| EP | 0 542 716 | A1 | 5/1993 |
| EP | 2 078 608 | A1 | 7/2009 |
| EP | 2 380 930 | A1 | 10/2011 |
| EP | 2 597 697 | A1 | 5/2013 |
| JP | H06503367 | A | 4/1994 |
| JP | 2005-187793 | A | 7/2005 |
| JP | 2005-533919 | A | 11/2005 |
| JP | 2005-336490 | A | 12/2005 |
| JP | 2010-126699 | A | 6/2010 |
| JP | 2017-536449 | A | 12/2017 |
| KR | 20050037561 | A | 4/2005 |
| TW | 201402766 | A | 1/2014 |
| WO | 2004/009720 | A2 | 1/2004 |
| WO | 2005118679 | A1 | 12/2005 |
| WO | 2014/001005 | A1 | 1/2014 |
| WO | 2014/095385 | A1 | 6/2014 |
| WO | 2015154947 | A1 | 10/2015 |

OTHER PUBLICATIONS

International Search Report dated Dec. 23, 2015, in connection with PCT International Application No. PCT/EP2015/073898.

English translation of International Search Report dated Dec. 23, 2015, in connection with PCT International Application No. PCT/EP2015/073898.

English translation of Office Action dated May 7, 2018, in connection with Japanese Patent Application No. 2017-523283, dated May 7, 2018.

English translation of Office Action dated Nov. 8, 2018, in connection with Korean Patent Application No. 10-2017-7013521.

English translation of Office Action dated Apr. 19, 2019, in connection with Taiwanese Patent Application No. 104135079.

\* cited by examiner

PRIOR ART

ADHESIVES COMPRISING ACTIVATABLE GETTER MATERIALS

This application is a continuation of U.S. patent application Ser. No. 15/520,003, filed Apr. 18, 2017, which is a PCT § 371 national stage of PCT International Application No. PCT/EP2015/073898, filed Oct. 15, 2015, which claims foreign priority benefit under 35 U.S.C. § 119 of German Patent Application No. 10 2014 222 038.6, filed Oct. 29, 2014, the entire contents of each of which are incorporated herein by reference.

The present invention relates to an adhesive comprising a getter material and optionally a solvent, to an adhesive tape comprising this adhesive, to the use of such an adhesive and such an adhesive tape, and to a method for applying the adhesive or the adhesive tape. The invention further relates to an adhesive tape comprising this adhesive and to the use of such an adhesive.

BACKGROUND OF THE INVENTION

Such adhesives are common knowledge. The getter material present in the adhesive is capable of scavenging substances capable of permeation, for example water, oxygen, low molecular weight hydrocarbons or volatile organic compounds, which penetrate into the adhesive. Adhesives of this kind serve, for example, to encapsulate articles that are to be protected from water. The permeation-capable substance in this case is water. A particularly important field of use of such getters is in (opto)electronic arrangements.

(Opto)electronic arrangements are being used ever more frequently in commercial products. Arrangements of this kind comprise inorganic or organic electronic structures, for example organic, organometallic or polymeric semiconductors or else combinations thereof. These arrangements and products are rigid or flexible according to the desired use, there being an increasing demand for flexible arrangements. Arrangements of this kind are produced, for example, by printing methods such as relief printing, gravure printing, screen printing, flat printing, or else "non-impact printing", for instance thermal transfer printing, inkjet printing or digital printing. Also used in many cases, however, vacuum methods, for example chemical vapour deposition (CVD), physical vapour deposition (PVD), plasma-enhanced chemical or physical deposition (PECVD) methods, sputtering, (plasma) etching or vaporization, are used, in which case the structuring is generally effected by means of masks.

Examples of (opto)electronic applications that have already been commercialized or are of interest in terms of their market potential include electrophoretic or electrochromic assemblies or displays, organic or polymeric light-emitting diodes (OLEDs or PLEDs) in readout and display devices or as lighting, electroluminescent lamps, light-emitting electrochemical cells (LEECs), organic solar cells, preferably dye or polymer solar cells, inorganic solar cells, preferably thin-film solar cells, especially based on silicon, germanium, copper, indium and selenium, perovskite solar cells, organic field-effect transistors, organic switching elements, organic optical amplifiers, organic laser diodes, organic or inorganic sensors or else organic- or inorganic-based RFID transponders.

Further applications of encapsulating adhesive tapes are known in the field of battery technology, especially in the field of flexible microbatteries and thin-film batteries, very particularly those comprising lithium-containing cathodes, anodes or electrolytes.

Accordingly, in this document, an organic (opto)electronic arrangement is understood to mean an electronic arrangement which comprises at least one electronically functional, at least partly organic constituent—for example organometallic compounds—or wherein the electronically functional structure has a thickness of less than 20 µm.

A technical challenge for the achievement of adequate lifetime and functioning of (opto)electronic arrangements in the field of inorganic and/or organic (opto)electronics, but very particularly in the field of organic (opto)electronics, is considered to be protection of the components present therein from permeates. Permeates may be a multitude of low molecular weight organic or inorganic compounds, especially water vapour and oxygen.

A multitude of (opto)electronic arrangements in the field of inorganic and/or organic (opto)electronics, very particularly in the case of use of organic raw materials, are sensitive both to water vapour and to oxygen, the penetration of water or water vapour being classified as a major problem for many arrangements. During the lifetime of the electronic arrangement, therefore, protection by encapsulation is required, since the performance otherwise declines over the period of use. For example, oxidation of the constituents can result, for instance, in a severe reduction in luminance in the case of light-emitting arrangements such as electroluminescent lamps (EL lamps) or organic light-emitting diodes (OLEDs), in contrast in the case of electrophoretic displays (EP displays), or in efficiency within a very short time in the case of solar cells.

In order to achieve very good sealing, specific barrier adhesives are used (also referred to as adhesives having water vapour barrier properties). A good adhesive for the sealing of (opto)electronic components has low permeability to oxygen and especially to water vapour, has sufficient adhesion on the arrangement and can adapt well thereto.

The barrier action is typically characterized by reporting the oxygen transmission rate (OTR) and the water vapour transmission rate (WVTR). The respective rate indicates the area- and time-based flow of oxygen or water vapour through a film under specific conditions of temperature and partial pressure and possibly further measurement conditions such as relative air humidity. The smaller these values, the better the suitability of the respective material for encapsulation. The reported permeation is not based solely on the values of WVTR or OTR but always also includes specification of the mean path length of the permeation, for example the thickness of the material, or normalization to a particular path length.

The permeability P is a measure of the ability of gases and/or liquids to permeate through a body. A low P value indicates a good barrier action. The permeability P is a specific value for a defined material and a defined permeate under steady-state conditions with a particular permeation path length, partial pressure and temperature. The permeability P is the product of the diffusion term D and solubility term S: $P = D \cdot S$.

The solubility term S predominantly describes the affinity of the barrier adhesive for the permeate. In the case of water vapour, for example, a small value of S is achieved by hydrophobic materials. The diffusion term D is a measure of the mobility of the permeate in the barrier material and is directly dependent on properties such as molecular mobility or the free volume. It is often the case that relatively low values are achieved for D in highly crosslinked or highly crystalline materials. However, highly crystalline materials are generally less transparent, and greater crosslinking leads to lower flexibility. The permeability P typically rises with an increase in molecular mobility, for instance when the temperature is increased or the glass transition point is exceeded.

Attempts to increase the barrier action of an adhesive have to take account of both parameters D and S, especially with regard to the effect on the permeability of water vapour and oxygen. In addition to these chemical properties, effects of physical influences on permeability also have to be considered, especially the mean permeation path length and interfacial properties (adaptation characteristics of the adhesive, adhesion). The ideal barrier adhesive has low D values and S values combined with very good adhesion on the substrate.

A low solubility term S alone is usually insufficient to achieve good barrier properties. A particular classic example of this is that of siloxane elastomers. The materials are extremely hydrophobic (small solubility term), but by virtue of the free rotation about the Si—O bond (large diffusion term) have a comparatively small barrier action against water vapour and oxygen. For good barrier action, a good balance is thus needed between the solubility term S and diffusion term D.

There have additionally been descriptions of barrier adhesives based on styrene block copolymers and resins having maximum hydrogenation levels (see DE 10 2008 047 964 A1).

Permeation values (WVTR) of commonly used adhesive systems are also reported here (measured at 37.5° C. and 90% relative humidity). Typical acrylate-based pressure-sensitive adhesives are in the range between 100 g/m² d and 1000 g/m² d. Because of the high mobility of the chains, pressure-sensitive silicone adhesives have even higher permeation values for water of more than 1000 g/m² d. If styrene block copolymers are used as elastomer component, WVTR values in the range from 50-100 g/m² d are achieved for unhydrogenated or incompletely hydrogenated systems and values below 50 g/m² d for hydrogenated systems (for example SEBS). Particularly low WVTR values of less than 15 g/m² d are achieved both with pure poly(isobutylene) elastomers or block copolymers of styrene and isobutylene.

One means of improving the barrier action again is the use of substances which react with the penetrating substances, called the permeation-capable substances, for example water or oxygen. Permeation-capable substances that penetrate into the (opto)electronic arrangement, such as oxygen or water vapour, are then bound chemically or physically, preferably chemically, to these substances and hence increase the breakthrough time ("lag time"). These substances are referred to in the literature as "getters", "scavengers", "desiccants" or "absorbers". The term "getters" is used hereinafter. A getter or getter material is a material capable of sorption of at least one permeation-capable substance.

Getter materials are, for example, salts such as cobalt chloride, calcium chloride, calcium bromide, lithium chloride, lithium bromide, magnesium chloride, barium perchlorate, magnesium perchlorate, zinc chloride, zinc bromide, silicas (for example silica gel), aluminium sulphate, calcium sulphate, copper sulphate, barium sulphate, magnesium sulphate, lithium sulphate, sodium sulphate, cobalt sulphate, titanium sulphate, sodium dithionite, sodium carbonate, potassium disulphite, potassium carbonate, magnesium carbonate, titanium dioxide, kieselguhr, zeolites, sheet silicates such as montmorillonite and bentonite, metal oxides such as barium oxide, calcium oxide, iron oxide, magnesium oxide, sodium oxide, potassium oxide, strontium oxide, aluminium oxide (activated alumina); and also carbon nanotubes, activated carbon, phosphorus pentoxide and silanes; readily oxidizable metals, for example iron, calcium, sodium and magnesium; metal hydrides, for example calcium hydride, barium hydride, strontium hydride, sodium hydride and lithium aluminium hydride; hydroxides such as potassium hydroxide and sodium hydroxide, metal complexes, for example aluminium acetylacetonate; and additionally organic absorbers, for example polyolefin copolymers, polyamide copolymers, PET copolyesters, anhydrides of mono- and polycarboxylic acids such as acetic anhydride, propionic anhydride, butyric anhydride or methyltetrahydrophthalic anhydride, isocyanates or further absorbers based on hybrid polymers, which are usually used in combination with catalysts, for example cobalt; further organic absorbers, for instance lightly crosslinked polyacrylic acid, polyvinyl alcohol, ascorbates, glucose, gallic acid or unsaturated fats and oils.

In accordance with their function, the getter materials are preferably used as essentially permeate-free materials, for example in water-free form. This distinguishes getter materials from similar materials which are used as filler. For example, silica is frequently used as filler in the form of fumed silica. If this filler, however, is stored as usual under ambient conditions, it absorbs water even from the environment and is no longer able to function as a getter material to an industrially utilizable degree. It is only silica that has been dried or kept dry that can be utilized as getter material. However, it is also possible to use materials already partly complexed with permeates, for example $CaSO_4 * \frac{1}{2}H_2O$ (calcium sulphate hemihydrate) or partly hydrated silicas which exist by definition as compounds of the general formula $(SiO_2)m * nH_2O$.

As described above, silicas are understood to mean compounds of the general formula $(SiO_2)m * nH_2O$. This is silicon dioxide produced by wet-chemical, thermal or pyrogenic methods. More particularly, suitable getter materials among the silicas are silica gels, for example silica gels impregnated with cobalt compounds as moisture indicator (blue gel), and fumed silicas.

"Sorption" is understood to mean the process of one or more substances being taken up by another substance—according to the invention by the getter material. The getter could therefore also be referred to as "sorbent" or "sorption agent". The sorption of the permeation-capable substance(s) by the getter material may, for example, be by absorption or adsorption, in which case adsorption may occur either in the form of chemisorption or of physisorption.

A "permeation-capable substance" is understood to mean a substance which can penetrate into the adhesive to be protected as a gaseous or liquid substance, or else as the case may be as a solid substance, and can subsequently penetrate through it. Substances of this kind have been referred to above and are referred to hereinafter as "permeates". The permeates may come from the adhesive itself or from the environment, for example even from the carrier material of an adhesive tape coated with the adhesive. Low molecular weight organic compounds such as solvent residues, residual monomers, oils, resin components, plasticizers and water frequently emanate from the adhesive or the adhesive tape itself. Water, volatile organic compounds (VOCs), low molecular weight hydrocarbons and oxygen often emanate from the environment.

For water, for example, one way in which the penetrating water is bound is by physical means via adsorption typically on silica, molecular sieves, zeolites or sodium sulphate. Water is bound chemically via alkoxysilanes, oxazolidines, isocyanates, barium oxide, phosphorus pentoxide, alkali metal and alkaline earth metal oxides (for example calcium oxide), metallic calcium or metal hydrides (WO 2004/009720 A2).

Such getters that have been described in adhesives are mainly inorganic fillers, for example calcium chloride or various oxides (cf. U.S. Pat. No. 5,304,419 A, EP 2 380 930 A1 or U.S. Pat. No. 6,936,131 A).

Organic getters have also been described in adhesives, for example in EP 2 597 697 A1, in which polymeric alkoxysilanes are used as getters. Numerous different silanes as getters in adhesives are mentioned in WO 2014/001005 A1. From the large selection of alkoxysilanes, the person skilled in the art would at first choose readily hydrolysable alkoxysilanes, for example methoxysilanes. However, particularly good activities are achieved in the case of encapsulation of assemblies in organic electronics when the alkoxy group is an ethoxy group. It has been found that, surprisingly, the ethoxysilanes, which are less reactive compared to methoxysilanes, reduce the permeation of moisture much better, particularly at high temperatures. This is unexpected since methoxysilanes normally have a higher reactivity than the corresponding ethoxysilanes (cf. Wacker product description 6085e/09.13 "GENIOSL®", page 11 from September 2013 (09.13)).

Difficulties in the case of such adhesives or tapes made from such adhesives are storage and transport before the ultimate use. An adhesive or tape comprising a getter has to be stored and/or transported with hermetic sealing until use. Penetrating permeates such as moisture in particular are absorbed by the getter, as a result of which it is used up and hence the barrier capacity is reduced. This is very disadvantageous specifically for applications in electronics, since the adhesive tapes are usually die-cut to size at external converters and hence have contact with moisture. Thus, the water scavengers in the tape are used up sometimes to a greater degree and sometimes to a lesser degree according to the time taken by the converter for die-cutting and the air humidity present. Apart from the reduction in the getter function, i.e. apart from the ability to act as getters—and in this case to absorb water, it is thus no longer possible to make any clear statement as to the getter capacity, i.e. as to the ability to absorb water, that the adhesive or the adhesive tape still has after application.

It was therefore an object of the invention to provide an adhesive which tolerates brief contact with permeates such as moisture in particular before user application, without any significant impairment of getter capacity.

SUMMARY OF THE INVENTION

It has been found that, surprisingly, it is possible to obtain such an adhesive when an adhesive of the type specified at the outset comprises a catalyst activatable by means of an external stimulus for the reaction of the getter material with a permeate. The present invention is of particularly good suitability for water as permeate.

In the case of such an adhesive, the getter function can be activated when required, i.e. especially when the adhesive has been applied and is to protect an article from the permeate, for example water vapour. Such an adhesive can be referred to as "switchable". Its permeate-binding function, especially water-binding function, can be "switched on" by an external stimulus or trigger, by activating the catalyst by means of the external stimulus or trigger. During the storage or transport of the adhesive, the catalyst and hence the getter function have yet to be activated or switched on. The getter reacts to an insignificant degree, if at all, with the permeate, more particularly with water vapour, and is not used up. Only when the adhesive has been applied and is in fact to protect an article from water vapour and from penetration of water vapour is the getter activated or "switched on" and assumes its function.

DETAILED DESCRIPTION

The catalyst changes the rate constant for the reaction of the getter with the permeate, especially water (vapour). A change in the context of the present invention is when the rate constant is increased at least by a factor of 5, preferably 10, more preferably at least by a factor of 50.

The catalyst may, for example, be a latent acid or a latent base, meaning that the catalyst after activation can alter the chemical environment in terms of the acid-base properties and hence accelerate a reaction having a rate dependent on this environment. For instance, the dependence of the reaction rate on the pH using the example of a silane is described in J. Org. Chem., Vol. 51, No. 20, 1986, pages 3827-3830. Further pH-dependent reactions with water are, for example, the hydrolysis of anhydrides, carbodiimides, oxazolidones, esters or isocyanates.

Examples of such latent systems which can bring about a change in the environment are systems based on onium salts, especially on sulphonium and iodonium, and on metallocene.

In the case of water, the getter material has its lowest activity with respect to water preferably in the neutral or quasi-neutral environment. A "neutral environment" is understood to mean an environment that would correspond to a pH of 7 in aqueous solution. A "quasi-neutral environment" is understood to mean the range that would correspond to a pH between 6 and 8, preferably a pH of 6.5 to 7.5, in aqueous solution. In a neutral environment, the getter material in this case has its lowest reaction rate for the reaction with water. The reaction rate is so low that there is no significant reaction with water (vapour). If the environment, in contrast, becomes acidic or basic, the reaction rate increases significantly.

Other catalysts known to those skilled in the art are also suitable for the invention. This is especially true of catalysts that have been nano- or microencapsulated. These catalysts are activated by breaking the encapsulation.

The amount of catalyst present in the inventive adhesive is preferably less than 5% by weight, more preferably less than 2% by weight and especially less than 1% by weight. Thus, comparatively small amounts are sufficient to achieve the effect of the invention.

"External stimulus" means an outside effect on the catalyst that activates it.

Particularly suitable external stimuli are UV radiation, a temperature change, microwave radiation or visible light, very particular preference being given to UV radiation. Simple activation by UV radiation is possible; on the other hand, it is improbable that the adhesive will accidentally be exposed to UV radiation before the desired application, and so unintended activation can be avoided.

More preferably, the adhesive comprises an adhesive base composed of at least one elastomer and at least one tackifying resin. A particularly suitable adhesive thus comprises adhesive base, getter material, optionally a solvent and a catalyst activatable by means of an external stimulus for the reaction of the getter material with a permeate.

In addition, the inventive adhesive is preferably a pressure-sensitive adhesive. This makes it possible for the ease of use to be particularly good, since the adhesive already sticks to the site to be bonded even prior to crosslinking.

The inventive adhesive is of particularly good suitability when it further comprises at least one reactive resin having at least one curable group. Such adhesives can be applied, but are still deformable at first. It is only after reaction of the curable group that the adhesive cures and displays its full bonding action.

Particularly suitable curable groups are cyclic ether, vinyl, acrylate, methacrylate, hydroxyl, amino and/or isocyanate. It is also possible for a plurality of different curable groups to be present in the reactive resin.

When the adhesive comprises a reactive resin, systems of this kind are particularly easy to handle, where the stimulus for the catalyst for the reaction of the getter material with water is simultaneously the initiator for the curing of the reactive resin. UV radiation in particular is particularly suitable here as stimulus. In that case, the catalyst is a photocatalyst.

On the other hand, adhesives of good suitability also include those which do not contain any reactive resin. Adhesives of this kind do not need the additional curing step, and so there is no need to consider any demands on the curing of the reactive groups in such a system, and the only concern is that the getter material is activated in the requisite manner.

Pressure-sensitive adhesives in particular are particularly suitable as adhesives without reactive resin.

Preferably, the adhesive is a barrier adhesive having an adhesive base which—in the case of presence of a reactive resin after curing—has a water vapour permeation rate of less than 100 g/m²d, preferably of less than 50 g/m²d, especially less than 15 g/m²d.

Preferably, the adhesive has a neutral or quasi-neutral environment prior to the stimulation of the catalyst. Thus, it is preferable that the adhesive does not contain any acidic or basic groups, and especially no organic acids, acrylic acids, methacrylic acids, amines, amides or polymers thereof.

More preferably, the getter material is at least one compound selected from the group comprising alkoxysilanes and alkoxysiloxanes. These compounds ensure a neutral environment. The alkoxysilanes and alkoxysiloxanes may be preferable here as monomers or as oligomers having 2 to 40 repeat $SiR_2$ groups. The compounds may be catenated or cyclic.

"Silanes" are understood to mean compounds of the general formula $R_a$—Si—$X_{4-a}$ or partial condensation products thereof. In the formula, a is an integer from 0 to 3 and preferably 0 or 1. X is a hydrolysable group, for example and with preference a halogen atom, especially chlorine, an alkoxy group, for example a methoxy, ethoxy, n-propoxy, isopropoxy, n-butoxy, sec-butoxy or tert-butoxy group, or an acetoxy group. Further examples of hydrolysable groups known to those skilled in the art are likewise usable in the context of the present invention. If a plurality of X substituents are present, they may be the same or different. R is an optionally substituted hydrocarbyl radical, for example a methyl, ethyl, n-propyl, isopropyl, n-butyl, sec-butyl or tert-butyl group, a pentyl group and branched isomers thereof, a hexyl group and the branched isomers, a heptyl group and the branched isomers, an octyl group and the branched isomers, a nonyl group and the branched isomers, a decyl group and the branched isomers, an undecyl group and the branched isomers, a dodecyl group and the branched isomers, a tetradecyl group and the branched isomers, a hexadecyl group and the branched isomers, an octadecyl group and the branched isomers or an eicosyl group and the branched isomers. The hydrocarbyl radicals may additionally contain cyclic and/or aromatic components. Representative structures of these are cyclohexyl, phenyl and benzyl groups. Optionally, the hydrocarbyl radical(s) R contain(s), for example, one or more heteroatom-containing substituents such as amino groups, aminoalkyl groups, glycidyloxy groups, (meth)acryloyloxy groups and the like. If a plurality of R substituents are present, they may be the same or different.

A silane usable as getter material is preferably selected from the group comprising N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-aminopropyldiethoxymethylsilane, N-(2-aminoethyl)-3-aminopropyldimethoxymethylsilane, (N-butyl)-3-aminopropyltrimethoxysilane, 3-(N-ethylamino)-2-methylpropyltrimethoxysilane, 4-amino-3,3-dimethylbutyltrimethoxysilane, 4-amino-3,3-dimethylbutyldimethoxymethylsilane, (N-cyclohexyl)aminomethyldimethoxymethylsilane, (N-cyclohexyl)aminomethyltrimethoxysilane, (N-phenyl)-3-aminopropyltrimethoxysilane, (N-phenyl)aminomethyldimethoxymethylsilane, (N-benzyl-2-aminoethyl)-3-aminopropyltrimethoxysilane, [2-(N-benzyl-N-vinylamino)ethyl]-3-aminopropyltrimethoxysilane hydrogenchloride, [2-(N-benzyl-N-vinylamino)ethyl]-3-aminopropyltrimethoxysilane, bis(3-propyltriethoxysilyl)amine, vinyltrimethoxysilane, vinyltriethoxysilane, vinyltri(2-methoxyethoxy)silane, vinyltriisopropoxysilane, vinyldimethoxymethylsilane, vinyltriacetoxysilane, 3-triethoxysilylpropylsuccinic anhydride, 3-glycidyloxypropyltrimethoxysilane, 3-glycidyloxypropyltriethoxysilane, 2-(3,4-epoxycyclohexyl)ethyltriethoxysilane, 2-(3,4-epoxycyclohexyl)ethyltrimethoxysilane, 2-(3,4-epoxycyclohexyl)ethylmethyldimethoxysilane, 2-(3,4-epoxycyclohexyl)ethylmethyldiethoxysilane, triethoxyoctylsilane, trimethoxyoctylsilane, 3-glycidyloxypropyldiethoxymethylsilane, 3-methacryloyloxypropyltrimethoxysilane, 3-methacryloyloxypropyltriethoxysilane, 3-methacryloyloxypropyltriisopropoxysilane, 3-methacryloyloxypropyldimethoxymethylsilane, 3-methacryloyloxypropyldiethoxymethylsilane, 3-chloropropyltrimethoxysilane, 3-chloropropyltriethoxysilane, 3-isocyanatopropyltrimethoxysilane, 3-isocyanatopropyltriethoxysilane, isocyanatomethyltrimethoxysilane, isocyanatomethyldimethoxymethylsilane, tris[3-(trimethoxysilyl)propyl] isocyanurate, 3-ureidopropyltrimethoxysilane, 3-ureidopropyltriethoxysilane, 2-hydroxy-4-(3-triethoxysilylpropoxy)benzophenone, 4-(3'-chlorodimethylsilylpropoxy)benzophenone, 3-mercaptopropyltrimethoxysilane, 3-mercaptopropyldimethoxymethylsilane, bis(3-triethoxysilylpropyl)disulphane, bis(3-triethoxysilylpropyl)tetrasulphane, bis(triethoxysilylpropyl)polysulphane and octadecylaminodimethyltrimethoxysilylpropylammonium chloride. It is also possible to use other non-crosslinking alkoxysilanes as getter material.

Siloxanes in the context of the invention are understood to mean compounds having at least two $SiR_2$ groups bonded via an oxygen atom. In the alkoxysiloxanes that are particularly suitable in accordance with the invention, at least one R radical is an alkoxy group. Examples of siloxanes that are particularly suitable in accordance with the invention are oligomers or polymers of the silanes mentioned in the preceding paragraph.

Preferably, the getter has at least one curable group. Particularly suitable curable groups are cyclic ether, vinyl, acrylate, methacrylate, hydroxyl, amino or isocyanate.

In the case of alkoxysiloxanes as getter, the alkoxysiloxane preferably has one alkoxy group and one curable group per silicon atom. Said alkoxy group may be the same as or different from adjacent Si-alkoxy groups. The curable group of adjacent repeat units may likewise be the same or different.

In the case of alkoxysilanes as getter, the alkoxysilane has at least one ethoxy group and at least one curable group, the curable group being a cyclic ether group. Particularly suitable cyclic ether groups are an epoxide or oxirane group, and the silanes 2-(3,4-epoxycyclohexyl)ethyltrimethoxysilane and especially 2-(3,4-epoxycyclohexyl)ethyltriethoxysilane and 2-(3,4-epoxycyclohexyl)ethylmethyldiethoxysilane are particularly preferred.

Particularly good properties are possessed by adhesives where the amount of getter material is at least 2% by weight, preferably at least 3% by weight and especially at least 5% by weight. Very particularly advantageous adhesives are those where the amount of getter material is 3% to 15% by weight, preferably 4% to 10% by weight and especially 4.5% to 7% by weight.

The proportion of the reactive resin in the adhesive is from 15% to 80% by weight, especially from 20% to 70% by weight and more preferably from 25% to 65% by weight. In order to achieve good ease of use and an elastic adhesive after curing, a preferred reactive resin content is 15% to 35% by weight, especially 20% to 30% by weight. For more highly crosslinked adhesive bonds, reactive resin contents of 65% to 80% by weight are preferred. Reactive resin contents giving a particularly good balance in relation to elasticity and crosslinking level are from 35% to 65% by weight.

In a preferred execution, the reactive resin comprises epoxy groups, especially aliphatic and very especially preferably cycloaliphatic epoxy groups. Of very good suitability are reactive resins containing glycidyl and/or epoxycyclohexyl groups as curable group.

Very particularly suitable adhesives are those in which the reactive resin and alkoxysilane or alkoxysiloxane have the same kind of groups, especially the same curable groups. In this case, the reactive resin and alkoxysilane or siloxane can polymerize and crosslink with one another in a particularly good manner. "The same kind of functional curable groups" is understood to mean those that are chemically very similar to one another, for example cyclic ethers having different ring size or epoxy ethers wherein the cycloaliphatic structures have a different ring size.

In a preferred execution, the adhesive is cured by cationic, thermal or radiation-induced means. It is additionally preferable that the adhesive contains at least one type of photoinitiator for the cationic curing of the crosslinkable component.

In a particularly preferred embodiment, the adhesive contains a reactive resin and the steps of curing and activating of the getter proceed at the same time and curing and activating are induced in the same way. For example, the crosslinking reaction of the reactive resin can be induced by UV. UV radiation can also bring about a change in the environment from neutral to acidic, for example, which again results in the activation of the getter. Parallel curing and activation is particularly suitable because only one step is required after the adhesive or adhesive tape has been applied. It is likewise the case that only one device is required, for example a UV radiation source. It is likewise possible for curing and getter activation to be thermally induced.

Pressure-sensitive adhesives refer to adhesives which, even under relatively gentle contact pressure, allow a lasting bond to the substrate and can be detached again from the substrate essentially without residue after use. Pressure-sensitive adhesives are permanently pressure-sensitive at room temperature, and thus have sufficiently low viscosity and high tackiness to the touch, such that they wet the surface of the particular substrate even at low contact pressure. The bonding capacity of corresponding adhesives is based on their adhesive properties, and the redetachability on their cohesive properties. Useful bases for pressure-sensitive adhesives include various materials.

The polymer may be a polymer, or else a mixture of two or more different polymers. In this case, the at least one polymer may especially be an elastomer or a thermoplastic.

Elastomers used may in principle be any elastomers that are customary in the pressure-sensitive adhesives sector, as described, for example, in the "Handbook of Pressure Sensitive Adhesive Technology" by Donatas Satas (Satas & Associates, Warwick 1999).

Preferably in the context of the application, the elastomers used, in a chemical sense, are formed from at least one olefinic monomer or from polyurethane and are, for example, elastomers based on polyurethanes, natural rubbers, synthetic rubbers such as butyl, (iso)butyl, nitrile or butadiene rubbers, styrene block copolymers having an elastomer block formed from unsaturated or partly or fully hydrogenated polydiene blocks (polybutadiene, polyisoprene, poly(iso)butylene, copolymers of these and further elastomer blocks familiar to those skilled in the art), polyolefins, fluoropolymers and/or silicones.

Preferably, the at least one elastomer is formed from at least one olefinic monomer and/or from at least one polyurethane. More preferably, the elastomer is at least one vinylaromatic block copolymer.

If rubber or synthetic rubber or blends produced therefrom are used as base material for the pressure-sensitive adhesive, the natural rubber may in principle be chosen from all available qualities, for example crepe, RSS, ADS, TSR or CV types, according to the required purity and viscosity level, and the synthetic rubber(s) from the group of the randomly copolymerized styrene-butadiene rubbers (SBR), the butadiene rubbers (BR), the synthetic polyisoprenes (IR), the butyl rubbers (IIR), the halogenated butyl rubbers (XIIR), the acrylate rubbers (ACM), the ethylene-vinyl acetate copolymers (EVA) or the polyurethanes and/or blends thereof.

The at least one polymer used may also be any kind of thermoplastic known to those skilled in the art, as specified, for example, in the textbooks "Chemie and Physik der synthetischen Polymere" [Chemistry and Physics of Synthetic Polymers] by J. M. G. Cowie (Vieweg, Braunschweig) and "Makromolekulare Chemie" [Macromolecular Chemistry] by B. Tieke (VCH Weinheim, 1997). These are, for example, poly(ethylene), poly(propylene), poly(vinyl chloride), poly(styrene), poly(oxymethylenes), poly(ethylene oxide), poly(ethylene terephthalate), poly(carbonates), poly(phenylene oxides), poly(urethanes), poly(ureas), phenoxy resins, acrylonitrile-butadiene-styrene (ABS), poly(amides) (PA), poly(lactate) (PLA), poly(ether ether ketone) (PEEK), poly(sulphone) (PSU), poly(ether sulphone) (PES). Poly(acrylates), poly(methacrylates) and poly(methyl methacrylates) (PMMA) are likewise possible as polymer, but are not preferred in the context of the present invention.

Latent catalysts usable for the catalysis of the hydrolysis of alkoxysilanes are especially systems based on sulphonium, iodonium and metallocene. For examples of sulphonium-based cations, reference is made to the details given in U.S. Pat. No. 6,908,722 B1 (especially columns 10 to 21).

Examples of anions which serve as counterions for the abovementioned cations include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethylphenyl)borate, bi(trifluoromethylsulphonyl)amide and tris(trifluoromethylsulphonyl)methide. Other conceivable anions particularly for iodonium-based initiators are additionally chloride, bromide or iodide, but preference is given to initiators that are essentially free of chlorine and bromine.

More specifically, the usable systems include sulphonium salts (see, for example, U.S. Pat. Nos. 4,231,951 A, 4,256,828 A, 4,058,401 A, 4,138,255 A and US 2010/063221 A1), such as triphenylsulphonium hexafluoroarsenate, triphenylsulphonium hexafluoroborate, triphenylsulphonium tetrafluoroborate, triphenylsulphonium tetrakis(pentafluorobenzyl)borate, methyldiphenylsulphonium tetrafluoroborate, methyldiphenylsulphonium tetrakis(pentafluorobenzyl)borate, dimethylphenylsulphonium hexafluorophosphate, triphenylsulphonium hexafluorophosphate, triphenylsulphonium hexafluoroantimonate, diphenylnaphthylsulphonium hexafluoroarsenate, tritolylsulphonium hexafluorophosphate, anisyldiphenylsulphonium hexafluoroantimonate, 4-butoxyphenyldiphenylsulphonium tetrafluoroborate, 4-chlorophenyldiphenylsulphonium hexafluoroantimonate, tris(4-phenoxyphenyl)sulphonium hexafluorophosphate, di(4-ethoxyphenyl)methylsulphonium hexafluoroarsenate, 4-acetylphenyldiphenylsulphonium tetrafluoroborate, 4-acetylphenyldiphenylsulphonium tetrakis(pentafluorobenzyl)borate, tris(4-thiomethoxyphenyl)sulphonium hexafluorophosphate, di(methoxysulphonylphenyl)methylsulphonium hexafluoroantimonate, di(methoxynaphthyl)methylsulphonium tetrafluoroborate, di(methoxynaphthyl)methylsulphonium tetrakis(pentafluorobenzyl)borate, di(carbomethoxyphenyl)methylsulphonium hexafluorophosphate, (4-octyloxyphenyl)diphenylsulphonium tetrakis(3,5-bis(trifluoromethyl)phenyl)borate, tris[4-(4-acetylphenyl)thiophenyl]sulphonium tetrakis(pentafluorophenyl)borate, tris(dodecylphenyl)sulphonium tetrakis(3,5-bis-trifluoromethylphenyl)borate, 4-acetamidophenyldiphenylsulphonium tetrafluoroborate, 4-acetamidophenyldiphenylsulphonium tetrakis(pentafluorobenzyl)borate, dimethylnaphthylsulphonium hexafluorophosphate, trifluoromethyldiphenylsulphonium tetrafluoroborate, trifluoromethyldiphenylsulphonium tetrakis(pentafluorobenzyl)borate, phenylmethylbenzylsulphonium hexafluorophosphate, 5-methylthianthrenium hexafluorophosphate, 10-phenyl-9,9-dimethylthioxanthenium hexafluorophosphate, 10-phenyl-9-oxothioxanthenium tetrafluoroborate, 10-phenyl-9-oxothioxanthenium tetrakis(pentafluorobenzyl)borate, 5-methyl-10-oxothianthrenium tetrafluoroborate, 5-methyl-10-oxothianthrenium tetrakis(pentafluorobenzyl)borate and 5-methyl-10,10-dioxothianthrenium hexafluorophosphate, iodonium salts (see, for example, U.S. Pat. Nos. 3,729,313 A, 3,741,769 A, 4,250,053 A, 4,394,403 A and US 2010/063221 A1), such as diphenyliodonium tetrafluoroborate, di(4-methylphenyl)iodonium tetrafluoroborate, phenyl-4-methylphenyliodonium tetrafluoroborate, di(4-chlorophenyl)iodonium hexafluorophosphate, dinaphthyliodonium tetrafluoroborate, di(4-trifluoromethylphenyl)iodonium tetrafluoroborate, diphenyliodonium hexafluorophosphate, di(4-methylphenyl)iodonium hexafluorophosphate, diphenyliodonium hexafluoroarsenate, di(4-phenoxyphenyl)iodonium tetrafluoroborate, phenyl-2-thienyliodonium hexafluorophosphate, 3,5-dimethylpyrazolyl-4-phenyliodonium hexafluorophosphate, diphenyliodonium hexafluoroantimonate, 2,2'-diphenyliodonium tetrafluoroborate, di(2,4-dichlorophenyl)iodonium hexafluorophosphate, di(4-bromophenyl)iodonium hexafluorophosphate, di(4-methoxyphenyl)iodonium hexafluorophosphate, di(3-carboxyphenyl)iodonium hexafluorophosphate, di(3-methoxycarbonylphenyl)iodonium hexafluorophosphate, di(3-methoxysulphonylphenyl)iodonium hexafluorophosphate, di(4-acetamidophenyl)iodonium hexafluorophosphate, di(2-benzothienyl)iodonium hexafluorophosphate, diaryliodonium tristrifluoromethylsulphonylmethide such as diphenyliodonium hexafluoroantimonate, diaryliodonium tetrakis(pentafluorophenyl)borate such as diphenyliodonium tetrakis(pentafluorophenyl)borate, (4-n-desiloxyphenyl)phenyliodonium hexafluoroantimonate, [4-(2-hydroxy-n-tetradesiloxy)phenyl]phenyliodonium hexafluoroantimonate, [4-(2-hydroxy-n-tetradesiloxy)phenyl]phenyliodonium trifluorosulphonate, [4-(2-hydroxy-n-tetradesiloxy)phenyl]phenyliodonium hexafluorophosphate, [4-(2-hydroxy-n-tetradesiloxy)phenyl]phenyliodonium tetrakis(pentafluorophenyl)borate, bis(4-tert-butylphenyl)iodonium hexafluoroantimonate, bis(4-tert-butylphenyl)iodonium hexafluorophosphate, bis(4-tert-butylphenyl)iodonium trifluorosulphonate, bis(4-tert-butylphenyl)iodonium tetrafluoroborate, bis(dodecylphenyl)iodonium hexafluoroantimonate, bis(dodecylphenyl)iodonium tetrafluoroborate, bis(dodecylphenyl)iodonium hexafluorophosphate, bis(dodecylphenyl)iodonium trifluoromethylsulphonate, di(dodecylphenyl)iodonium hexafluoroantimonate, di(dodecylphenyl)iodonium triflate, diphenyliodonium bisulphate, 4,4'-dichlorodiphenyliodonium bisulphate, 4,4'-dibromodiphenyliodonium bisulphate, 3,3'-dinitrodiphenyliodonium bisulphate, 4,4'-dimethyldiphenyliodonium bisulphate, 4,4'-bis(succinimidodiphenyl)iodonium bisulphate, 3-nitrodiphenyliodonium bisulphate, 4,4'-dimethoxydiphenyliodonium bisulphate, bis(dodecylphenyl)iodonium tetrakis(pentafluorophenyl)borate, (4-octyloxyphenyl)phenyliodonium tetrakis(3,5-bis-trifluoromethylphenyl)borate and (tolylcumyl)iodonium tetrakis(pentafluorophenyl)borate, and ferrocenium salts (see, for example, EP 542 716 B1) such as $\eta^5$-(2,4-cyclopentadien-1-yl)-[(1,2,3,4,5,6,9)-(1-methylethyl)benzene]iron.

In addition, photolatent bases are described in the paper "Photolatent bases: new catalysts for UV-curing of coatings" by J. Studer et al., which was presented at Radtech e5: UV & EB Technology Conference 2006 (RadTech International, NA, 23.-26. April 2006, Lakeside Center at McCormick Place—Chicago, Ill.). Examples of photolatent bases mentioned therein are ammonium salts of phenylglyoxylates, benzhydrylammonium salts, N-benzophenonemethyltri-N-alkylammonium salts, amine imide derivatives, α-ammonioacetophenone salts or N-methylnifedipine. Further examples of photolatent bases can be found in "Coatings & Inks—Photoinitiators Part 3: What's New or May Be Coming" (Gordon Bradley, 24 Jan. 2007) and in the U.S. Pat.

Nos. 6,489,374, 6,087,070, US 20040242867 and US 20030212164 cited therein, for example 4-(ortho-nitrophenyl)dihydropyridine, quaternary organoboron photoinitiators, α-aminoacetophenones and tetra- or triarylalkyl borates of α-ammonioalkenes, iminioalkenes or amidinioalkenes, and compounds that release DBN (1,5-diazabicyclo[4.3.0]non-5-ene) under UV light.

Other activatable catalysts are known by virtue of methods of nano- or microencapsulation known to those skilled in the art and are described in detail in "Encapsulation Nanotechnologies" edited by Vikas Mittal, Wiley. Typical release mechanisms are described in chapter 10.8.2 therein.

Suitable tackifying resins that are optionally present are tackifying resins as known to those skilled in the art, for example from the Satas.

Particularly advantageously, the pressure-sensitive adhesive contains at least one type of a preferably at least partly hydrogenated tackifying resin, advantageously one compatible with the elastomer component or, if a copolymer formed from hard and soft blocks is used, mainly with the soft block (plasticizer resins).

It is advantageous when corresponding tackifying resin has a softening temperature measured by the Ring & Ball method of greater than 25° C. It is additionally advantageous when, in addition, at least one type of tackifying resin having a softening temperature of less than 20° C. is used. It is possible by this means, if required, to finely adjust the adhesive characteristics on the one hand, but also the adaptation characteristics on the bonding substrate on the other hand.

For comparatively nonpolar elastomers, resins used in the pressure-sensitive adhesive may advantageously be partially or fully hydrogenated resins based on rosin and rosin derivatives, hydrogenated polymers of dicyclopentadiene, partially, selectively or fully hydrogenated hydrocarbon resins based on $C_5$, $C_5/C_9$ or $C_9$ monomer streams, polyterpene resins based on α-pinene and/or β-pinene and/or 6-limonene and/or $\Delta^3$-carene, hydrogenated polymers of preferably pure $C_8$ and $C_9$ aromatics. The aforementioned tackifying resins may be used either alone or in a mixture.

It is possible to use resins that are either solid or liquid at room temperature. In order to assure a high ageing and UV stability, preference is given to hydrogenated resins having a hydrogenation level of at least 90%, preferably of at least 95%.

Reactive resins optionally present, which are also referred to as crosslinkable components, may in principle be any reactive constituents that are known to the person skilled in the art in the field of pressure-sensitive adhesives or reactive adhesives and form macromolecules that crosslink in a molecular weight-increasing reaction, as described, for example, in Gerd Habenicht: Kleben-Grundlagen, Technologien, Anwendungen [Adhesive Bonding Principles, Technologies, Applications], 6th edition, Springer, 2009. These are, for example, constituents that form epoxides, polyesters, polyethers, polyurethanes or phenol resin, cresol or novolak based polymers, polysulphides or acrylic polymers (acrylic, methacrylic).

The structure and chemical nature of the crosslinkable components are uncritical, provided that they are at least partly miscible with the elastomer phase and the molecular weight-increasing reaction can be conducted under conditions, especially in terms of the temperatures employed, type of catalysts used and the like, that do not lead to any significant impairment and/or breakdown of the elastomer phase.

The reactive resin preferably consists of a cyclic ether and is suitable for the radiation-chemical and optionally thermal crosslinking with a softening temperature of less than 40° C., preferably of less than 20° C.

The reactive resins based on cyclic ethers are especially epoxides, i.e. compounds which bear at least one oxirane group, or oxetanes. They may be aromatic or especially aliphatic or cycloaliphatic in nature.

Usable reactive resins may be monofunctional, difunctional, trifunctional or tetrafunctional or have higher functionality up to polyfunctional, the functionality relating to the cyclic ether group.

Examples, without wishing to impose a restriction, are 3,4-epoxycyclohexylmethyl-3',4'-epoxycyclohexane carboxylate (EEC) and derivatives, dicyclopentadiene dioxide and derivatives, 3-ethyl-3-oxetanemethanol and derivatives, diglycidyl tetrahydrophthalate and derivatives, diglycidyl hexahydrophthalate and derivatives, ethane 1,2-diglycidyl ether and derivatives, propane 1,3-diglycidyl ether and derivatives, butane-1,4-diol diglycidyl ether and derivatives, higher alkane 1,n-diglycidyl ethers and derivatives, bis[(3,4-epoxycyclohexyl)methyl] adipate and derivatives, vinylcyclohexyl dioxide and derivatives, cyclohexane-1,4-dimethanolbis(3,4-epoxycyclohexane carboxylate) and derivatives, diglycidyl 4,5-epoxytetrahydrophthalate and derivatives, bis[1-ethyl(3-oxetanyl)methyl] ether and derivatives, pentaerythritol tetraglycidyl ether and derivatives, bisphenol A diglycidyl ether (DGEBA), hydrogenated bisphenol A diglycidyl ether, bisphenol F diglycidyl ether, hydrogenated bisphenol F diglycidyl ether, epoxyphenol novolaks, hydrogenated epoxyphenol novolaks, epoxycresol novolaks, hydrogenated epoxycresol novolaks, 2-(7-oxabicyclo;spiro[1,3-dioxane-5,3'-[7]oxabicyclo[4.1.0]heptane], 1,4-bis((2,3-epoxypropoxy)methyl)cyclohexane.

Particularly suitable for cationic curing are reactive resins based on cyclohexyl epoxide, for example 3,4-epoxycyclohexylmethyl 3',4'-epoxycyclohexanecarboxylate (EEC) and derivatives and bis[(3,4-epoxycyclohexyl)methyl] adipate and derivatives.

Reactive resins may be used in their monomeric or else dimeric forms, trimeric forms, etc. up to and including their oligomeric forms.

Mixtures of reactive resins with one another, or else with other co-reactive compounds such as alcohols (monofunctional or polyfunctional) or vinyl ethers (monofunctional or polyfunctional) are likewise possible.

More preferably, the inventive adhesive is a pressure-sensitive adhesive. This makes it possible for the ease of use to be particularly good, since the adhesive already sticks to the site to be bonded even prior to crosslinking.

Pressure-sensitive adhesives refer to adhesives which, even under relatively gentle contact pressure, allow a lasting bond to the substrate and can be detached again from the substrate essentially without residue after use. Pressure-sensitive adhesives are permanently pressure-sensitive at room temperature, and thus have sufficiently low viscosity and high tackiness to the touch, such that they wet the surface of the particular substrate even at low contact pressure. The bonding capacity of corresponding adhesives is based on their adhesive properties, and the redetachability on their cohesive properties. Useful bases for pressure-sensitive adhesives include various materials.

The present invention additionally relates to an adhesive tape coated on one side or on both sides with the inventive adhesive. This adhesive tape may also be a transfer adhesive tape. An adhesive tape enables particularly simple and precise bonding and is therefore particularly suitable.

Finally, the present invention relates to the use or the inventive adhesive or the inventive adhesive tape as sealing compound, especially for encapsulation of assemblies in organic electronics. As detailed above, it is of eminent importance in organic electronics that the components have to be protected from water (vapour). Because of their very good barrier properties, the inventive adhesives or adhesive tapes are capable of giving corresponding protection. Because of the high transparency and low damage to the electronics to be encapsulated, the inventive adhesive and the inventive adhesive tape, as well as edge encapsulation, are especially also suitable for full-area encapsulation of organic electronics.

Finally, the present invention relates to a method for applying an adhesive or an adhesive tape having an adhesive, especially an inventive adhesive or an inventive adhesive tape, comprising the steps of applying the adhesive or the adhesive tape to the article to be bonded and activating the getter material by means of an external stimulus.

With this method, it is possible that the barrier action of an adhesive or an adhesive tape is not displayed until it is in fact required, i.e. when it encapsulates or covers an article to be protected. Only from this time is the getter active as a water scavenger. Since the getter function has not been activated beforehand, the getter is not used up during the preceding storage or transport.

The general expression "adhesive tape" encompasses a carrier material provided with a (pressure-sensitive) adhesive on one or both sides. The carrier material includes any flat structures, for example films or film sections elongated in two dimensions, tapes having extended length and limited width, tape sections, die-cut parts (for example in the form of edges or boundaries of an (opto)electronic arrangement), multilayer arrangements and the like. For various applications, it is possible to combine a wide variety of different carriers, for example films, woven fabrics, nonwoven fabrics and papers, with the adhesives. In addition, the term "adhesive tape" also encompasses what are called "transfer adhesive tapes", i.e. an adhesive tape with no carrier. In the case of a transfer adhesive tape, the adhesive is instead applied prior to application between flexible liners provided with a release layer and/or having anti-adhesive properties. For application, it is regularly the case that one liner is first removed, the adhesive is applied and then the second liner is removed. The adhesive can thus be used directly for bonding of two surfaces in (opto)electronic arrangements.

Also possible are adhesive tapes in which there are not two liners but instead a single double-sided separating liner. In that case, the adhesive tape web is covered on its top side by one side of a double-sided separating liner and on its bottom side by the reverse side of the double-sided separating liner, especially of an adjacent winding in a bale or a roll.

The carrier material used for an adhesive tape in the present context preferably comprises polymer films, film composites, or films or film composites provided with organic and/or inorganic layers. Films/film composites of this kind may consist of any standard plastics used for film production, by way of example but without restriction:

polyethylene, polypropylene—especially oriented polypropylene produced by mono- or biaxial stretching (OPP), cyclic olefin copolymers (COC), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyether sulphone (PES) or polyimide (PI).

Polyester films have the advantage of ensuring thermal stability and introducing elevated mechanical stability. Most preferably, therefore, a carrier layer in an inventive liner consists of a polyester film, for example of biaxially stretched polyethylene terephthalate.

In a preferred embodiment, the carrier material also includes a barrier function against one or more specific permeate(s), especially against water vapour and oxygen. Such a barrier function may consist of organic or inorganic materials. Carrier materials having a barrier function are described in detail in EP 2 078 608 A1.

More preferably, the carrier material comprises at least one inorganic barrier layer. Inorganic barrier layers of particularly good suitability are metals deposited under reduced pressure (for example by means of vaporization, CVD, PVD, PECVD) or under atmospheric pressure (for example by means of atmospheric plasma, reactive corona discharge or flame pyrolysis), such as aluminium, silver, gold, nickel, or especially metal compounds such as metal oxides, nitrides or hydronitrides, for example oxides or nitrides of silicon, of boron, of aluminium, of zirconium, of hafnium or of tellurium, or indium tin oxide (ITO). Likewise suitable are layers of the aforementioned variants that have been doped with further elements.

In the case of double-sided (self-)adhesive tapes, the upper and lower layers employed may be inventive adhesives of the same or different kind(s) and/or of the same or different layer thickness(es). The carrier on one or both sides may have been pretreated in accordance with the prior art, such that, for example, an improvement in adhesive anchoring is achieved. It is likewise possible for one or both sides to have been provided with a functional layer which can function, for example, as barrier layer. The pressure sensitive adhesive layers may optionally be covered with release papers or release films. Alternatively, it is also possible for only one adhesive layer to be covered with a double-sided separating liner.

In one variant, in the double-sided (self-)adhesive tape, an inventive adhesive is provided, as is one further adhesive, for example any having particularly good adhesion to a covering substrate or exhibiting particularly good repositionability.

The thickness of the pressure-sensitive adhesive present either in the form of a transfer adhesive tape or coated on a flat structure is preferably between 1 µm and 2000 µm, further preferably between 5 µm and 500 µm and more preferably between about 12 µm and 250 µm.

Layer thicknesses between 50 µm and 150 µm are used when improved adhesion on the substrate and/or a dampening effect is to be achieved.

Layer thicknesses between 1 µm and 50 µm reduce the material input. However, there is a reduction in the adhesion on the substrate.

For double-sided adhesive tapes, it is likewise the case for the adhesive(s) that the thickness of the individual pressure-sensitive adhesive layer(s) is preferably between 1 µm and 2000 µm, further preferably between 5 µm and 500 µm and more preferably between about 12 µm and 250 µm. If a further adhesive is used in addition to one inventive adhesive in double-sided adhesive tapes, it may also be advantageous if the thickness thereof is above 150 µm.

Adhesive tapes coated with adhesives on one or both sides are usually wound at the end of the production process to give a roll in the form of an Archimedean spiral. In order to prevent the adhesives from coming into contact with one another in the case of double-sided adhesive tapes, or in order to prevent the adhesive from sticking to the carrier in the case of single-sided adhesive tapes, the adhesive tapes are covered with a covering material (also referred to as separating material) prior to winding, which is wound up together with the adhesive tape. The person skilled in the art knows such covering materials by the name of liner or release liner. As well as the covering of single- or double-sided adhesive tapes, liners are also used to cover pure adhesives (transfer adhesive tape) and adhesive tape sections (for example labels).

A further main claim relates to a method for protecting an organic electronic arrangement disposed on a substrate, wherein a cover is applied to the electronic arrangement in such a way that the electronic arrangement is at least partly covered by the cover, wherein the cover is additionally bonded over at least part of the area on the substrate and/or on the electronic arrangement, wherein the bonding is brought about by means of at least one layer of an adhesive. The adhesive layer especially takes the form of a layer of an adhesive tape.

The method of the invention can advantageously be conducted in such a way that the (pressure-sensitive) adhesive layer, optionally as a constituent of a double-sided adhesive tape comprising further layers, is applied first, and in a subsequent step the cover is applied to the substrate and/or the electronic arrangement. In a further advantageous procedure, the (pressure-sensitive) adhesive layer, optionally as a constituent of a double-sided adhesive tape comprising further layers, and the cover are applied together to the substrate and/or the electronic arrangement.

In the method of the invention, the transfer adhesive tape can thus first be bonded to the substrate or the electronic arrangement or first to the cover. However, it is preferable first to bond the transfer adhesive tape to the cover, since it is thus possible to pre-fabricate one component of the electronic functional unit independently of the electronic arrangement and to attach it by lamination as a whole.

Advantageously, the method of the invention can be conducted in such a way that the cover and/or the (pressure-sensitive) adhesive layer, especially as a transfer adhesive tape, fully cover the electronic arrangement, since the light-scattering action then affects the entire area of the arrangement.

The full-area lamination of the transfer adhesive tape over the electronic arrangement additionally rules out any effect of harmful permeates possibly enclosed in the gas space of a merely edge-encapsulated arrangement, since there is no gas space.

The method of the invention is preferably conducted in such a way that a region of the substrate around the electronic arrangement is also wholly or partly covered by the cover, in which case the adhesive tape for bonding may cover the full area of the electronic arrangement and preferably likewise covers a region of the substrate around the electronic arrangement, preferably the same region as the cover—or may be applied over part of the area, for instance in the form of a frame around the electronic arrangement—preferably in the region which is also covered by the cover—and optionally additionally in an edge region on the electronic arrangement.

The invention further provides an (opto)electronic arrangement comprising at least one (opto)electronic structure and a layer of an inventive adhesive, wherein the adhesive layer fully covers the (opto)electronic structure.

Further details, features and advantages of the present invention are elucidated in detail hereinafter by preferred working examples.

Figure 3:
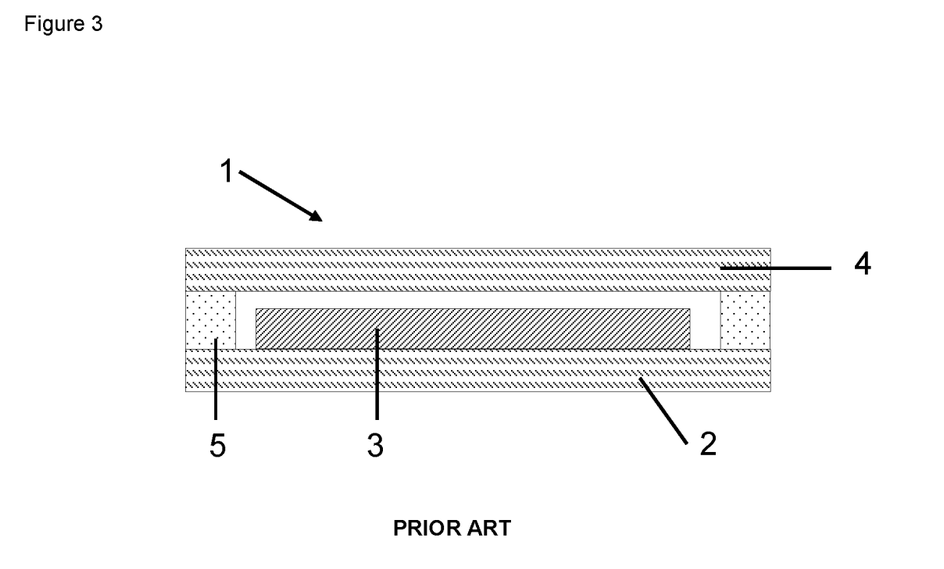
FIG. 3 illustrates an (opto)electronic arrangement according to the prior art in schematic view.

FIG. 3 shows a first configuration of an organic electronic arrangement 1 according to the prior art. This arrangement 1 has a substrate 2 with an electronic structure 3 disposed thereon. The substrate 2 itself takes the form of a barrier for permeates and hence forms part of the encapsulation of the electronic structure 3. Above the electronic structure 3, in the present case also spaced apart therefrom, is disposed a further cover 4 that takes the form of a barrier.

In order to encapsulate the electronic structure 3 at the side as well and simultaneously to bond the cover 4 to the electronic arrangement 1 in addition, an adhesive 5 is provided around the periphery alongside the electronic structure 3 on the substrate 2. It is unimportant here whether the adhesive has been bonded first to the substrate 2 or first to the cover 4. The adhesive 5 bonds the cover 4 to the substrate 2. By means of an appropriately thick configuration, the adhesive 5 additionally enables the cover 4 to be spaced apart from the electronic structure 3.

The adhesive 5 is one according to the prior art, i.e. an adhesive having a high permeation barrier, which may additionally be filled with getter material to a high degree. The transparency of the adhesive is irrelevant in this assembly.

In the present case, a transfer adhesive tape would be provided in the form of a die-cut part which, because of its delicate geometry, is more difficult to handle than a transfer adhesive tape applied essentially over the full area.

Figure 4:
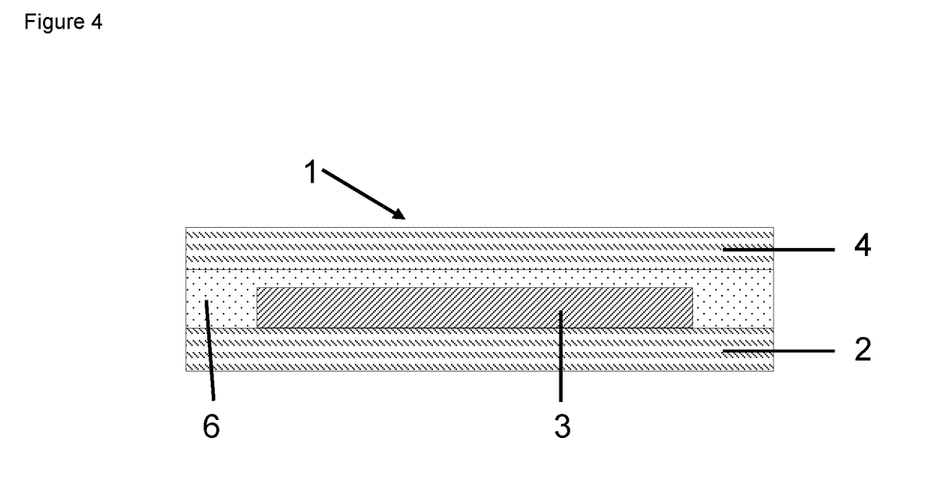
FIG. 4 illustrates a first inventive (opto)electronic arrangement in schematic view and FIG. 5 illustrates a second inventive (opto)electronic arrangement in schematic view.

FIG. 4 shows an inventive configuration of an (opto) electronic arrangement 1. What is shown is again an electronic structure 3 disposed on a substrate 2 and encapsulated by the substrate 2 from beneath. Above and to the side of the electronic structure, the inventive adhesive, for example in the form of a transfer adhesive tape 6, is now disposed over the full area. The electronic structure 3 is thus encapsulated fully by the transfer adhesive tape 6 from above. A cover 4 has then been applied to the transfer adhesive tape 6. The transfer adhesive tape 6 is one based on the inventive transfer adhesive tape as described above in general form and detailed hereinafter in working examples. The transfer adhesive tape, in the version shown, consists only of one layer of an inventive adhesive.

In contrast to the above configuration, the cover 4 need not necessarily satisfy the high barrier demands, since the barrier is already provided by the adhesive when the electronic arrangement is fully covered by the transfer adhesive tape. The cover 4 may, for example, merely assume a mechanical protective function, but it may also additionally be provided as a permeation barrier.

Figure 5:
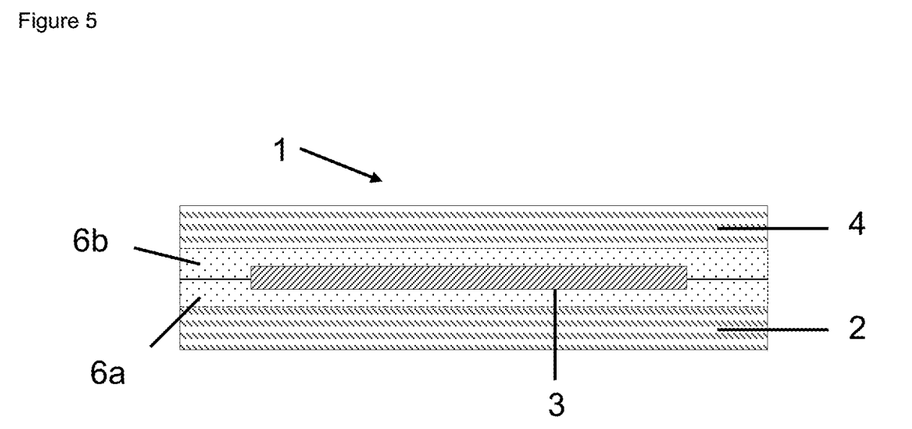

FIG. 5 shows an alternative configuration of an (opto) electronic arrangement 1. In contrast to the above configurations, two transfer adhesive tapes 6a, b are now provided, which are identical in the present case, but may also be different. The first transfer adhesive tape 6a is disposed over the full area of the substrate 2. The electronic structure 3 is provided upon and is fixed by the transfer adhesive tape 6a. The composite composed of the transfer adhesive tape 6a and electronic structure 3 is then fully covered by the further transfer adhesive tape 6b, such that the electronic structure 3 is encapsulated from all sides by the transfer adhesive tapes 6a, b. The cover 4 is in turn provided above the transfer adhesive tape 6b.

In this configuration, therefore, neither the substrate 2 nor the cover 4 need necessarily have barrier properties. They may nevertheless be provided, in order to further restrict the permeation of permeates to the electronic structure 3.

Especially with regard to FIGS. 4 and 5, it is pointed out that these are schematic diagrams. More particularly, it is not clear from the diagrams that the transfer adhesive tape here, and preferably in each case, has a homogeneous layer thickness. There is therefore no sharp edge formed at the transition to the electronic structure, as appears to be the case in the diagram; instead, the transition is fluid and it is in fact possible for small unfilled or gas-filled regions to remain. If necessary, however, matching to the substrate may also be effected, especially when the application is conducted under reduced pressure. Moreover, the adhesive is subject to different degrees of local compression, and so flow processes can result in a certain degree of compensation for the height differential at the edge structures. The dimensions shown are not to scale either, but instead serve merely for better illustration. Especially the electronic structure itself is generally relatively flat (often less than 1 μm thick).

Direct contact of the adhesive with the electronic assembly is not obligatory either. It is also possible for further layers to be disposed in between, for example a thin-layer encapsulation of the electronic assembly or barrier films.

The thickness of the transfer adhesive tape may include all customary thicknesses, for instance from 1 μm up to 3000 μm. Preference is given to a thickness between 25 and 100 μm, since bonding force and handling properties are particularly positive in this range. A further preferred range is a thickness of 3 to 25 μm, since the amount of substances permeating through the bondline within this range can be kept to a low level merely by virtue of the small cross-sectional area of the bondline in an encapsulation application.

For production of a transfer adhesive tape of the invention, the carrier of the adhesive tape or the liner is coated or printed on one side with the inventive adhesive from solution or dispersion or in neat form (for example of a melt), or the adhesive tape is produced by (co)extrusion. Alternatively, production is possible by transfer of an inventive adhesive layer by lamination to a carrier material or a liner. The adhesive layer can be crosslinked by means of heat or high-energy beams.

Preferably, this production process takes place in an environment in which the specific permeate is present only in a low concentration or is virtually not present at all. One example may be a relative air humidity of less than 30%, preferably of less than 15%.

EXAMPLES

Test Methods

Determination of Breakthrough Time (Lifetime Test)

Figure 1:
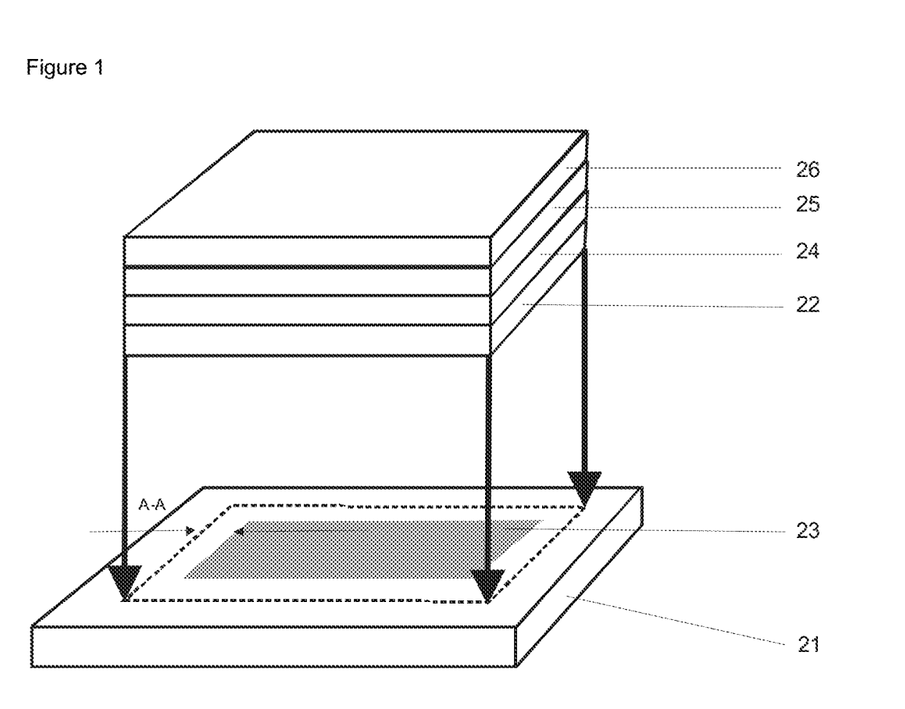
FIG. 1 illustrates a calcium test for determining breakthrouqh time.

A measure that was employed for the determination of the lifetime of an electronic assembly was a calcium test. This is shown in FIG. 1. For this purpose, a thin calcium layer 23 of 10×10 mm² in size is deposited onto a glass slide 21 under reduced pressure and then stored under a nitrogen atmosphere. The thickness of the calcium layer 23 is about 100 nm. For the encapsulation of the calcium layer 23, an adhesive tape (23×23 mm²) having the adhesive 22 to be tested and a thin glass slide 24 (35 μm, from Schott) as carrier material are used. For stabilization, the thin glass slide was laminated with a 100 μm-thick PET film 26 by means of a 50 μm-thick transfer adhesive tape 25 to give an acrylate pressure-sensitive adhesive of visually high transparency. The adhesive 22 is applied to the glass slide 21 in such a way that the adhesive 22 covers the calcium mirror 23 with an excess margin of 6.5 mm on all sides (A-A). Because of the impervious glass carrier 24, only the permeation through the pressure-sensitive adhesive or along the interfaces is determined.

The test is based on the reaction of calcium with water vapour and oxygen, as described, for example, by A. G. Erlat et. al. in "47th Annual Technical Conference Proceedings—Society of Vacuum Coaters", 2004, pages 654 to 659, and by M. E. Gross et al. in "46th Annual Technical Conference Proceedings—Society of Vacuum Coaters", 2003, pages 89 to 92. This involves monitoring the light transmission of the calcium layer, which increases as a result of the conversion to calcium hydroxide and calcium oxide. In the test setup described, this is done from the edge, such that the visible area of the calcium mirror decreases. The time until the light absorption of the calcium mirror has halved is referred to as the lifetime. The method covers both the decrease in the area of the calcium mirror from the edge and via point degradation in the area and the homogeneous reduction in the layer thickness of the calcium mirror resulting from full-area degradation.

Figure 2:
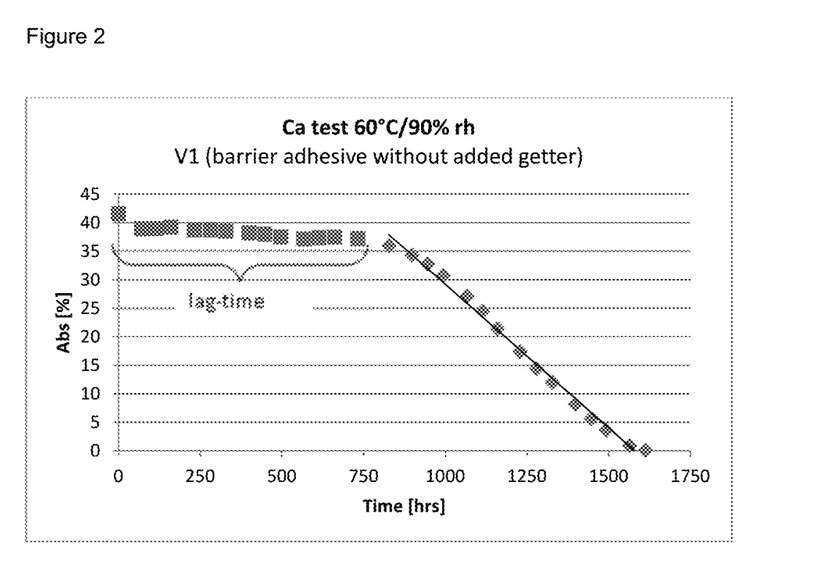
FIG. 2 illustrates the time that moisture takes to cover the distance to the calcium, defined as the breakthrouqh time.

The measurement conditions chosen were 60° C. and 90% relative air humidity. The specimens were bonded with a layer thickness of the pressure-sensitive adhesive of 50 μm over the full area and with no bubbles. The degradation of the calcium mirror is monitored via transmission measurements. The breakthrough time (lag time) is defined as that time that the moisture takes to cover the distance to the calcium (cf. FIG. 2). Before attainment of this time, there is only a marginal change in the transmission of the calcium mirror at 60° C./90% r.h. and a slight change at 85° C./85% r.h.

Permeability to Water Vapour

The determination of the permeability to water vapour (WVTR) is effected to ASTM F-1249. For this purpose, the pressure-sensitive adhesive is applied with a layer thickness of 50 μm to a highly permeable polysulphone membrane (available from Sartorius) which does not itself make any contribution to the permeation barrier. The water vapour permeability is determined at 37.5° C. and a relative humidity of 90% with a Mocon OX-Tran 2/21 measuring instrument.

Molecular Weight

The molecular weight determinations of the number-average molecular weights $M_n$ and the weight-average molecular weights $M_w$ were made by means of gel permeation chromatography (GPC). The eluent used was THF (tetrahydrofuran) with 0.1% by volume of trifluoroacetic acid. The measurement was made at 25° C. The precolumn used was PSS-SDV, 5μ, $10^3$ Å, ID 8.0 mm×50 mm. For separation, the columns used were PSS-SDV, 5µ, $10^3$ and $10^5$ and $10^6$ each with ID 8.0 mm×300 mm. The sample concentration was 4 g/l; the flow rate was 1.0 ml per minute. Measurement was effected against polystyrene standards.

MMAP and DACP

MMAP is the mixed methylcyclohexane/aniline cloud point which is determined using a modified ASTM C 611 method. Methylcyclohexane is used in place of the heptane used in the standard test method. The method uses resin/aniline/methylcyclohexane in a ratio of 1/2/1 (5 g/10 ml/5 ml), and the cloud point is determined by cooling a heated clear mixture of the three components until complete cloudiness has just set in.

The DACP is the diacetone cloud point and is determined by cooling a heated solution of 5 g of resin, 5 g of xylene and 5 g of diacetone alcohol to the point at which the solution turns cloudy.

Ring & Ball Softening Temperature

The tackifying resin softening temperature is determined by the standard methodology, which is known as the Ring and Ball method and is standardized in ASTM E28.

The tackifying resin softening temperature of the resins is determined using a Herzog HRB 754 Ring and Ball tester. Resin specimens are first crushed finely with a mortar and pestle. The resulting powder is introduced into a brass cylinder open at the base (internal diameter in the upper part of the cylinder 20 mm, diameter of the base opening of the cylinder 16 mm, height of the cylinder 6 mm) and melted on a hot stage. The filling volume is chosen such that the resin after melting fills the cylinder fully without excess.

The resulting specimen together with the cylinder is placed into the sample holder of the HRB 754. The equilibration bath is filled with glycerol if the tackifying resin softening temperature is between 50° C. and 150° C. At lower tackifying resin softening temperatures, it is also possible to work with a water bath. The test balls have a diameter of 9.5 mm and weigh 3.5 g. In accordance with the HRB 754 procedure, the ball is arranged above the test specimen in the equilibration bath and placed onto the test specimen. 25 mm beneath the base of the cylinder is a collector plate, and 2 mm above the latter is a light barrier.

During the measurement process, the temperature is increased at 5° C./min. In the temperature range of the tackifying resin softening temperature, the ball begins to move through the base opening of the cylinder until it finally comes to rest on the collector plate. In this position, it is detected by the light barrier and the temperature of the equilibration bath at this time is registered. A double determination takes place. The tackifying resin softening temperature is the average from the two individual measurements.

Adhesive Layers

For production of adhesive layers, various adhesives were applied from a solution to a conventional liner (siliconized polyester film) by means of a laboratory spreading instrument and dried. The adhesive layer thickness after drying is 50±5 µm. Drying was effected in each case first at RT for 10 minutes and at 120° C. in a laboratory drying cabinet for 10 minutes. The dried adhesive layers were each laminated on the open side immediately after drying with a second liner (siliconized polyester film with lower release force).

Raw Materials Used

| | |
|---|---|
| Sibstar 62M | SiBS (polystyrene-block-polyisobutylene block copolymer) from Kaneka with block polystyrene content 20% by weight. Also contains some diblock copolymer. |
| Tuftec P 1500 | SBBS with 30% block polystyrene content from Asahi. The SBBS contains about a 68% diblock content. |
| HBE-100 | hydrogenated bisphenol A diglycidyl ether from ECEM |
| Escorez 5300 | a fully hydrogenated hydrocarbon resin from Exxon (Ring and Ball 105° C., DACP = 71, MMAP = 72) |
| Escorez 5600 | hydrogenated hydrocarbon resin having a softening point of 100° C. from Exxon |
| Ondina G 17 | white oil composed of paraffinic and naphthenic components from Shell |
| Polyacrylate | acrylate copolymer formed from 2-hydroxyethyl acrylate, 2-ethylhexyl acrylate and C-17 acrylate, $M_n$ = 884 000 g/mol |
| Glycidoxypropyltriethoxysilane | triethoxysilane with glycidyl epoxide group |
| [4-(2-hydroxytetradecyloxy)-phenyl]phenyliodonium hexafluoroantimonate | cationic photoinitiator from Sigma-Aldrich The photoinitiator has an absorption maximum in the range of 320 nm to 360 nm and was in the form of a 50% by weight solution in propylene carbonate. |
| Titanium(IV) isopropoxide | catalyst for the hydrolysis of alkoxysilanes (Sigma-Aldrich) |

The copolymer selected was a polystyrene-block-polyisobutylene block copolymer from Kaneka. The proportion of styrene in the overall polymer is 20% by weight. Sibstar 62M was used. The molar mass $M_w$ is 60 000 g/mol. The glass transition temperature of the polystyrene blocks was 100° C. and that of the polyisobutylene blocks −60° C. The tackifying resin used was Escorez 5300 (Ring and Ball 105° C., DACP=71, MMAP=72) from Exxon, a fully hydrogenated hydrocarbon resin, or Escorez 5600 (softening point 100° C.), a hydrogenated hydrocarbon resin. These raw materials and optionally the alkoxysilane were dissolved in a mixture of toluene (300 g), acetone (150 g) and 60/95 special boiling point spirit (550 g), so as to give a 50% by weight solution.

Subsequently, a catalyst was added to the solution. The catalyst took the form of a 50% by weight solution in propylene carbonate. The photolatent catalyst has an absorption maximum in the range of 320 nm to 360 nm.

The exact composition of the individual examples V1 and V2 and of K1 and K2 can be found in Table 1.

TABLE 1

|  | Example: | | | |
|---|---|---|---|---|
|  | K1 pts. by wt. | K2 pts. by wt. | V1 pts. by wt. | V2 pts. by wt. |
| Sibstar 62M |  | 37.5 |  |  |
| HBE-100 |  | 20 |  | 20 |
| Escorez 5600 | 100 |  | 100 |  |
| Escorez 5300 |  | 37.5 |  |  |
| Ondina G17 | 25 |  | 25 |  |
| Tuftec P 1500 | 100 |  | 100 |  |
| Polyacrylate |  |  | — | 75 |
| Glycidoxypropyltriethoxysilane |  | 5 |  |  |
| Triethoxyoctylsilane | 10 |  |  | 5 |
| Titanium(IV) isopropoxide |  |  | 0.3 |  |
| [4-(2-hydroxytetradecyloxy)-phenyl]phenyliodonium hexafluoroantimonate | 0.3 | 0.1 |  | 0.1 |

The specimens were introduced into a glovebox. Some of the specimens were laminated without bubbles with a rubber roller onto a glass substrate which had been subjected to calcium vapour deposition. This was covered with the second PET liner and a ply of a thin glass was laminated on. This specimen was used for the lifetime test.

The results of the moisture permeation measurement of the adhesives and the breakthrough times determined for water in the calcium test before and after the activation of the catalyst and hence of the getter, and after the samples had been exposed to water, are shown in Table 2.

TABLE 2

|  | K1 | K2 | V1 | V2 |
|---|---|---|---|---|
| WVTR/g m$^{-2}$d$^{-1}$ | 33 | 12 | 34 | 678 |
| Lag time$^1$/h | 10 | 0 | 150 | 0 |
| Lag time$^2$/h | 150 | 470 | 150 | 0 |
| Lag time$^3$/h | 145 | 480 | 0 | 0 |

$^1$fresh adhesive tape (catalyst not activated by UV light), Ca test at 60° C./90% rh
$^2$fresh adhesive tape, activation of the catalyst with UV light, Ca test at 60° C./90% rh
$^3$after the sample had been exposed to H$_2$O at 23° C./50% rh for 1 day, drying again in an inert atmosphere, activation of the catalyst with UV light. Ca test at 60° C./90% rh.

For Comparative Example V1, a noninventive, i.e. non-switchable, catalyst was used. The sample has a certain lag time which does not change as a result of irradiation with UV light. The getter is not switchable. In the case of Inventive Example K1, the lag time changes significantly. In Example K1, the lag time after the activation of the catalyst and hence of the getter by UV radiation is 15 times higher than before the activation. K2 is an example of a combined activation of the getter and curing of the reactive resin. The adhesive does not have any lag time before activation/curing. The activation/curing results in achievement of a long lag time.

Once the nonactivated samples had been exposed to moist air for one day, the noninventive sample V1 shows that the getter had been used up and had already reacted with the water, and so the lag time had fallen to zero. In the case of the inventive samples K1 and K2, in contrast, the nonactivated getter did not react with the water present in the moist air during the one day. The lag time of the samples was essentially identical to that of a sample that had not been exposed to moist air. Even though the samples had thus been exposed to water vapour, this did not have any effect on their efficacy as getters, since the getter function had not yet been activated.

Comparative example V2 shows that a sample having a high WVTR does not have a measurable lag time.

The invention claimed is:

1. Adhesive comprising:
   an adhesive base;
   a getter material comprising at least one compound selected from the group consisting of an alkoxysilane and an alkoxysiloxane;
   a catalyst activatable by an external stimulus; and
   optionally a solvent,
   wherein:
   the catalyst catalyzes a reaction of the getter material with a permeate when activated by the external stimulus,
   the permeate is water,
   the adhesive is a barrier adhesive; and
   the adhesive base after curing has a water vapor permeation rate of less than 100 g/m$^2$d.

2. Adhesive according to claim 1, wherein the getter material is present in an amount of at least 2% by weight of the adhesive.

3. Adhesive according to claim 1, wherein the amount of the catalyst activatable by the external stimulus is less than 5% by weight of the adhesive.

4. Adhesive according to claim 1, wherein the external stimulus is ultraviolet radiation, a temperature change, microwave radiation, or visible light.

5. Adhesive according to claim 1, wherein the catalyst activatable by the external stimulus is a latent acid or a latent base.

6. Adhesive according to claim 1, wherein the adhesive base further comprises:
   at least one polymer; and
   at least one tackifying resin.

7. Adhesive according to claim 1, wherein the adhesive base further comprises at least one reactive resin comprising at least one curable group.

8. Adhesive according to claim 7, wherein the at least one curable group is a cyclic ether group, a vinyl group, an acrylate group, a methacrylate group, a hydroxyl group, an amino group, or an isocyanate group.

9. Adhesive according to claim 1, wherein the getter material is an ethoxysilane.

10. Adhesive according to claim 9, wherein the ethoxysilane further comprises at least one polymerizable group.

11. Adhesive according to claim 10, wherein the at least one polymerizable group is polymerizable with a reactive resin.

12. Adhesive according to claim 1, wherein the getter material further comprises at least one nonaromatic carbodiimide.

13. Adhesive according to claim 1, wherein the getter material further comprises at least one acid-hydrolysable ester and/or at least one base-hydrolysable ester.

14. Adhesive according to claim 1, wherein the getter material further comprises at least one oxazolidine.

15. Adhesive according to claim 14, wherein the catalyst activatable by an external stimulus is a latent base.

16. Adhesive according to claim 1, wherein the getter material further comprises at least one isocyanate.

17. Adhesive according to claim 16, wherein the catalyst activatable by an external stimulus is a latent base.

18. Adhesive according to claim 1, wherein the getter material further comprises at least one anhydride.

19. Adhesive according to claim 18, wherein the catalyst activatable by an external stimulus is a latent acid or a latent base.

20. Adhesive according to claim 1, wherein the adhesive is a pressure-sensitive adhesive.

21. Adhesive tape comprising an adhesive according to claim 1.

22. Method for encapsulating an assembly in organic electronics comprising encapsulating an assembly with the adhesive according to claim 1.

23. Method for applying an adhesive comprising:
applying the adhesive of claim 1 to an article; and
applying an external stimulus.

24. Method according to claim 23, wherein the adhesive comprises a reactive resin and the external stimulus induces activation of the getter material and curing of the adhesive.

25. Method for protecting an organic electronic arrangement disposed on a substrate, comprising applying a cover to an organic electronic arrangement such that the organic electronic arrangement is at least partly covered by the cover, wherein:
the cover is additionally bonded over at least part of an area on a substrate and/or on the organic electronic arrangement;
the bonding is brought about by at least one layer of an adhesive according to claim 1.

26. Method according to claim 25, wherein the adhesive takes the form of a layer of an adhesive tape.

27. Method according to claim 25, wherein the at least one layer of an adhesive is applied, and subsequently the cover is applied to the substrate and/or the organic electronic arrangement.

28. Method according to claim 25, wherein the at least one layer of an adhesive and the cover are applied to the substrate and/or the organic electronic arrangement.

29. Method according to claim 25, wherein the cover fully covers the organic electronic arrangement.

30. Method according to claim 25, wherein a region of the substrate around the organic electronic arrangement is wholly or partly covered by the cover.

31. Adhesive according to claim 1, wherein the cured adhesive base has a water vapor permeation rate of less than 50 $g/m^2d$.

32. Adhesive according to claim 1, wherein the cured adhesive base has a water vapor permeation rate of less than 15 $g/m^2d$.

* * * * *